Aug. 23, 1932.  E. B. G. LEFEVRE  1,873,607

UPHOLSTERY BUTTON CHAIN CLIP

Filed Sept. 29, 1930

INVENTOR.
E. B. G. Lefevre.

Witness.
C. C. McRae.

Patented Aug. 23, 1932

1,873,607

UNITED STATES PATENT OFFICE

EMIL B. G. LEFEVRE, OF DETROIT, MICHIGAN, ASSIGNOR TO FORD MOTOR COMPANY, OF DEARBORN, MICHIGAN, A CORPORATION OF DELAWARE

UPHOLSTERY BUTTON CHAIN CLIP

Application filed September 29, 1930. Serial No. 485,046.

The object of my invention is to provide a simple, durable and inexpensive means for securing upholstery on automobile seat cushions and the like.

Conventional upholstery buttons are herein used, the novel feature of the device being the clips for fastening the buttons to the anchoring chains.

More particularly the clips disclosed herein quickly and securely link the eye of the upholstery button to a light metal chain and likewise, a second clip links the opposite end of the chain to the bottom of the seat frame to thereby anchor the upholstery button.

The purpose of an upholstery button is to limit the upward movement of the seat due to the cushion springs. It is important that the compressing action of these springs not be interfered with by the anchoring device so that a flexible device as a chain should be used.

It has been customary for some time to provide light metallic chains extending from the under side of each button down to the lower cross rods of the cushion frame for this purpose. Several devices are now in use for linking these chains to both the cushion frame and the upholstery button, which devices are fairly satisfactory but which have a tendency to become disengaged through repeated use or are expensive. A low initial cost is desirable as many of these clips are required for a single cushion.

A simple hook cannot be employed satisfactorily for connecting these parts because when the cushion has a load on it the anchoring chain is slack and will readily unhook itself from the bottom of the cushion frame or from the button. When such chains are detached great inconvenience is caused because of the inaccessibleness of the chains and the difficulty in connecting the hooks. Consequently, when such detachment takes place the upholstery button becomes useless and causes an unsightly appearance of the upholstery.

My improved device, although exceptionally cheap to manufacture provides a simple and efficient means for positively preventing accidental detachment of the anchoring chain from either the button or the cushion frame.

With these and other objects in view, my invention consists in the arrangement, construction and combination of the various parts of my improved device, as described in the specification, claimed in my claims and illustrated in the accompanying drawing, in which:

Figure 1:
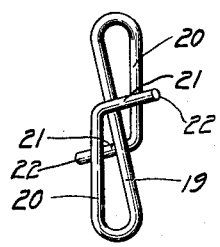
Figure 1 shows a plan view of my improved upholstery button chain clip.
Figure 2:
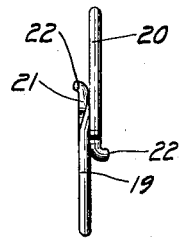
Figure 2 shows a side view of the clip shown in Figure 1.
Figure 4:
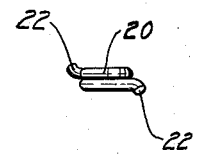
Figure 4 shows a top view of the clip shown in Figure 1.
Figure 3:
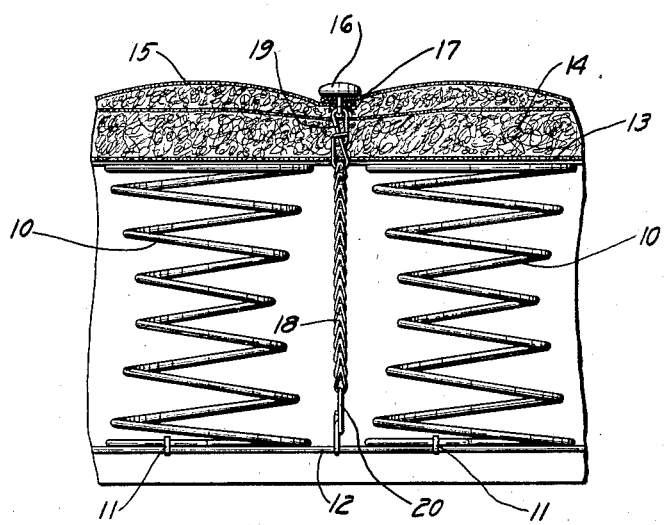
Figure 3 shows a cross-sectional view through a spring seat cushion, illustrating the use of my improved device.

Referring to the accompanying drawing, I have used the reference numeral 10 to indicate generally coil springs ordinarily used in a seat cushion, which springs are fastened by suitable fasteners 11 to a wire spring frame 12. A fabric spring covering 13 is secured over the upper ends of the seat springs 10 and curled hair or other filling material 14 is provided on the top of this covering. Upholstery 15 is placed over the filler 14 which upholstery is held in place by conventional upholstery buttons 16. These buttons 16 are each provided with an eye 17 extending from their under sides to anchor the buttons to the wire frame 12 thereby limiting the movement of the springs 10, preventing the filler 14 from shifting, and retaining the seat in the desired shape.

Generally speaking, the distance between the button 16 and the frame 12 in the ordinary automobile cushion is a matter of about six inches so that usually a chain 18 is fastened to the eye 17 which chain extends downward and is secured to the frame 12, thereby limiting the upward movement of the button. It is necessary to provide a chain or some other very flexible means for this purpose, because when the springs 10 are compressed through the use of the cushion the chain must be perfectly slack so as not to impair the resiliency of the cushion. My improved device consists in a simple means β-aminooxynaphthalene compound of the general formula

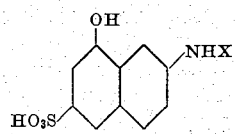

wherein X means alkyl or phenyl, converting Z into the amino group, diazotizing the latter and coupling it with an amino compound of the group consisting of aminobenzenes and aminonaphthalenes which after formation of the dye can no longer be diazotized.

8. The process which comprises diazotizing a compound of the general formula

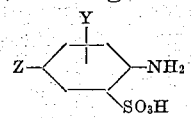

wherein Z means $NO_2$ or NH-acyl, and Y stands for H or $OCH_3$, coupling the diazo compound formed in an acid medium with a β-aminooxynaphthalene compound of the general formula

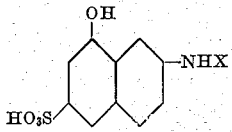

wherein X means alkyl or phenyl, converting Z into the amino group, diazotizing the latter and coupling it with an amino compound of the group consisting of alkylated anilines and β-naphthylamines.

9. The process which comprises diazotizing a compound of the general formula

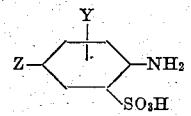

wherein Z means $NO_2$ or NH-acyl, and Y stands for H or $OCH_3$, coupling the diazo compound formed in an acid medium with a β-aminooxynaphthalene compound of the general formula

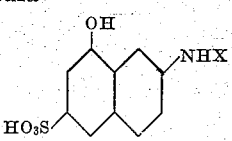

wherein X means alkyl or phenyl, converting Z into the amino group, diazotizing the latter and coupling it with an amino compound likewise in an acid medium with a 2-amino-8-hydroxynaphthalene-6-sulfonic acid.

10. The process which comprises diazotizing 1-amino-4-nitrobenzene-2-sulfonic acid, coupling the diazo compound in an acid medium with 2-amino-8-hydroxynaphthalene-6-sulfonic acid, reducing the nitro group of the mono azo-dye into the amino group, diazotizing the latter and coupling it again with 2-amino-8-hydroxynaphthalene-6-sulfonic acid in an acid medium.

11. The process which comprises diazotizing 5-amino-2-acetylamino-1-methoxybenzene-4-sulfonic acid, coupling the diazo compound in an acid medium with 2-amino-8-hydroxynaphthalene 6-sulfonic acid, saponifying the acetyl-amino group of the monoazo dye obtained, diazotizing the amino dye obtained and coupling it with 2-methylamino-8-hydroxynaphthalene-6-sulfonic acid in an acid medium.

12. The process which comprises diazotizing 5-amino-2-acetylamino-1-methoxybenzene-4-sulfonic acid, coupling the diazo compound in an acid medium with 2-amino-8-hydroxynaphthalene-6-sulfonic acid, saponifying the acetylamino group of the monoazo dye obtained, diazotizing the amino dye obtained and coupling it with 2-amino-8-hydroxynaphthalene-6-sulfonic acid in an acid medium.

In testimony whereof, we affix our signatures.

WERNER LANGE.
MAX RAECK.

termediate portion and having their end portions bent so as to extend across both said intermediate portion and the other bent back portion and resiliently urged into connection with each to form a pair of spaced closed loops, whereby one of said ends may be inserted into an upholstery button eye and the latter snapped successively past the coacting bent back portion and then the intermediate portion and then the opposite end portion into one of the loops, and a fastening chain link inserted into the other loop by inserting the other end member therethrough in like manner.

2. An upholstery button chain clip formed from spring wire having an intermediate portion with its ends bent back upon itself to form an S shaped clip, the bent back portions of said clip extending a substantial distance beyond the center of the intermediate portion and having their end portions bent at right angles so as to cross both said intermediate portion and the opposite bent back portion and resiliently urged into contact with each to form a pair of closed spaced loops, whereby one of said ends may be inserted into an upholstery button eye and the latter snapped successively past the opposite bent back portion and then the intermediate portion and then the opposite end portion into one of the loops, and a fastening chain link inserted into the other loop by inserting the other end member therethrough in like manner.

3. An upholstery button chain clip formed from spring wire having an intermediate portion with its end portions bent back upon itself to form an S shaped clip, the bent back portions extending beyond the center of the intermediate portion and having their end portions bent at substantially right angles so as to lie parallel with each other, said ends being resiliently urged into contact with both said intermediate portion and the opposite bent back portion to form a pair of closed spaced loops, whereby one of said ends may be inserted into an upholstery button eye and the latter snapped successively past the opposite bent back portion and then the intermediate portion and then the opposite end portion into one of the loops, and a chain link threaded into the other loop in like manner.

EMIL B. G. LEFEVRE.